March 8, 1966  C. W. LEE  3,238,623
PIPE JOINT MARKING TOOL
Filed Aug. 5, 1964  2 Sheets-Sheet 1

INVENTOR.
CALVIN W. LEE
BY Eugene M. Eckelman
ATTORNEY

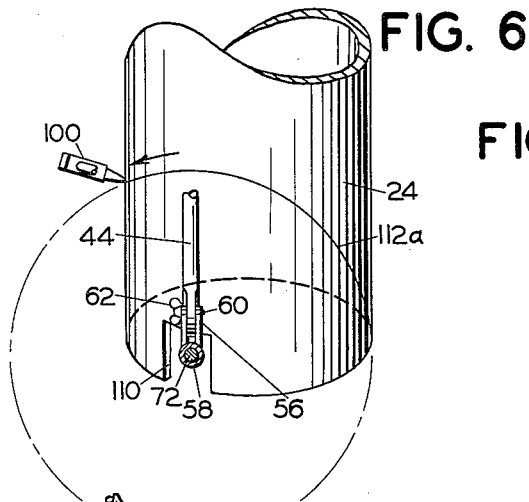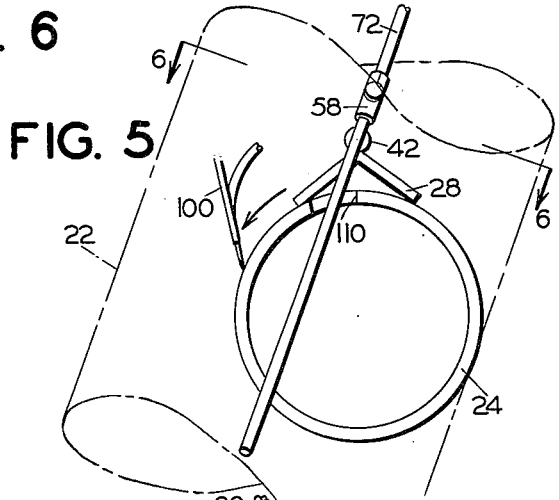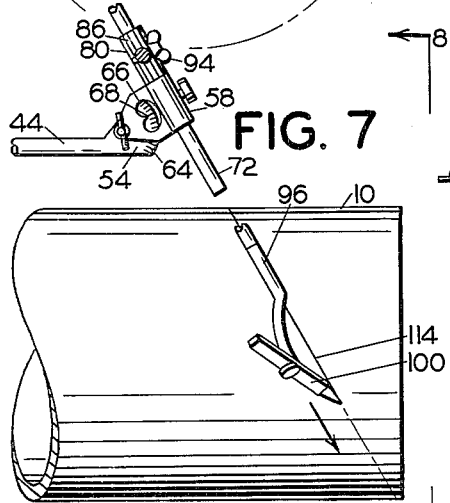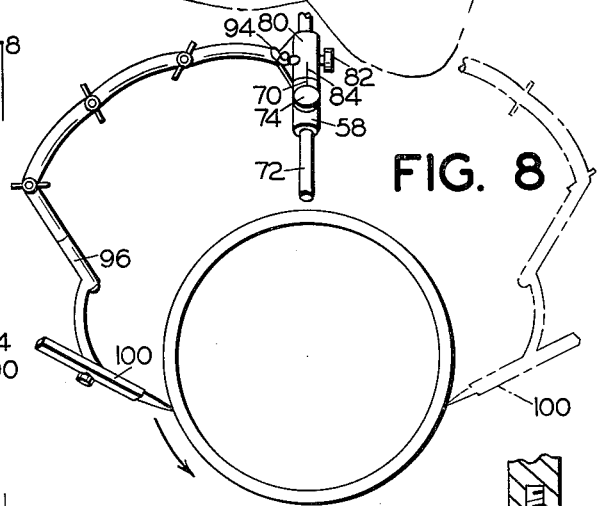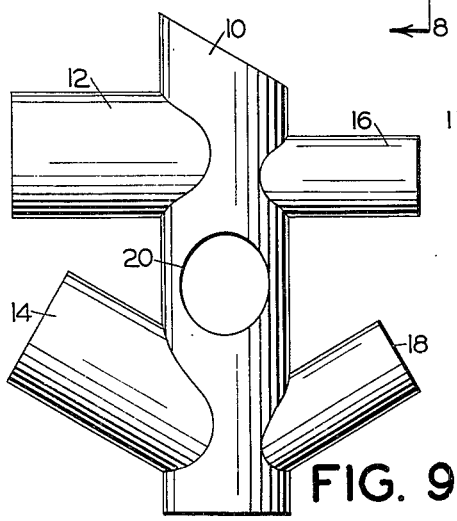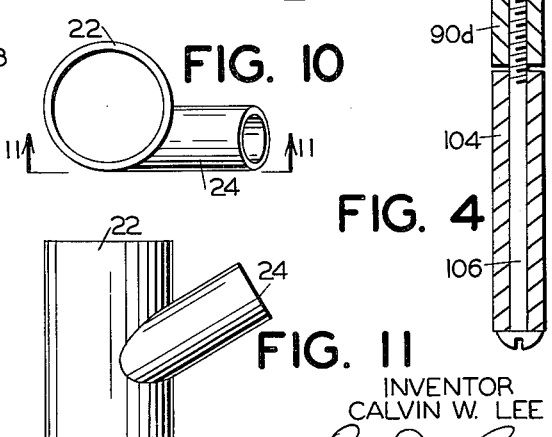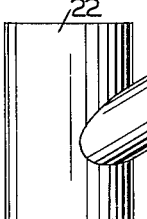

United States Patent Office 3,238,623
Patented Mar. 8, 1966

1

3,238,623
PIPE JOINT MARKING TOOL
Calvin W. Lee, 420 Division Road, St. Helens, Oreg.
Filed Aug. 5, 1964, Ser. No. 387,684
3 Claims. (Cl. 33—21)

This invention relates to new and useful improvements in pipe joint marking tools.

A primary objective of the present invention is to provide a tool of the type described which is simplified in construction and is easy and accurate in use.

Another object is to provide a pipe joint marking tool having a novel arrangement of structure facilitating assorted marking of guide lines on pipes for making cuts in the pipes such as saddle cuts in the ends thereof, saddle openings for receiving pipe ends, and mitered joints.

Another object is to provide a tool of the type described which through the novel construction of a marker holding arm is capable of marking an entire cut without shifting of holding means for the tool.

Another object is to provide a pipe joint marking tool having suitable graduations for setting the device at desired angular positions of marking.

Another object is to provide a tool of the type described having novel base means for releasable attachment to a pipe for accomplishing a marking process.

Additional objects will become apparent from the following specification and claims, considered together with the accompanying drawings, wherein the numerals of reference indicate like parts.

In the drawings:

FIGURE 4 is an enlarged, fragmentary sectional view of a portion of a marker holding arm of the tool, taken on the line 4—4 of FIGURE 2;

FIGURE 5 is a fragmentary front elevational view of the tool as set up for accomplishing the marking of a pipe end for setting the pipe into another pipe in off-center relation;

FIGURE 6 is a sectional view taken on the line 6—6 of FIGURE 5;

FIGURE 7 is a fragmentary side elevational view of the tool as set up for marking the pipe for a miter joint;

FIGURE 8 is an end elevational view taken on the line 8—8 of FIGURE 7; and

FIGURES 9, 10 and 11 illustrate various pipe joints the markings for which can be accomplished by the present tool.

Referring first to FIGURE 9 there is shown a plurality of pipe joints the markings for which may be made by the present tool. As an example, markings may be made for joining a pair of pipes 10 and 12 of equal diameter in a right angle, centered relation; of joining a pair of pipes 10 and 14 of equal diameter but in other than right angle relationship; in joining a pair of pipes 10 and 16 of unequal diameter in right angle relationship; and in joining a pair of pipes 10 and 18 of unequal diameter but in other than right angle relationship. FIGURE 9 also illustrates a saddle opening 20 in the pipe 10, and in addition FIGURES 10 and 11 show the joining of pipes in off-center relation, each of which joints may be marked by the present tool for cutting.

The tool is also capable of marking miter joints as will be more apparent hereinafter.

Figure 3:
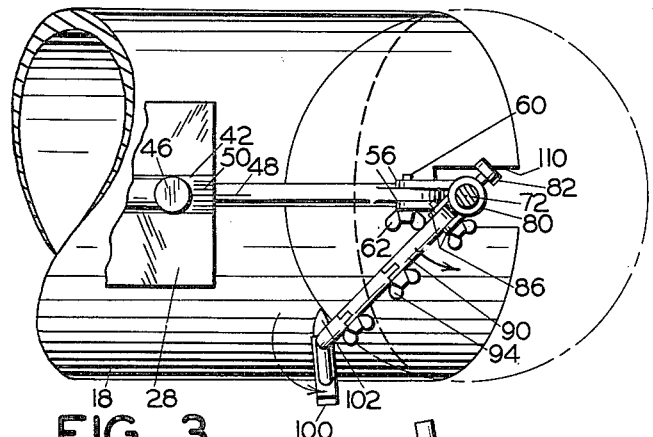
FIGURE 3 is a plan view of the tool taken on the line 3—3 of FIGURE 1.
Figure 2:
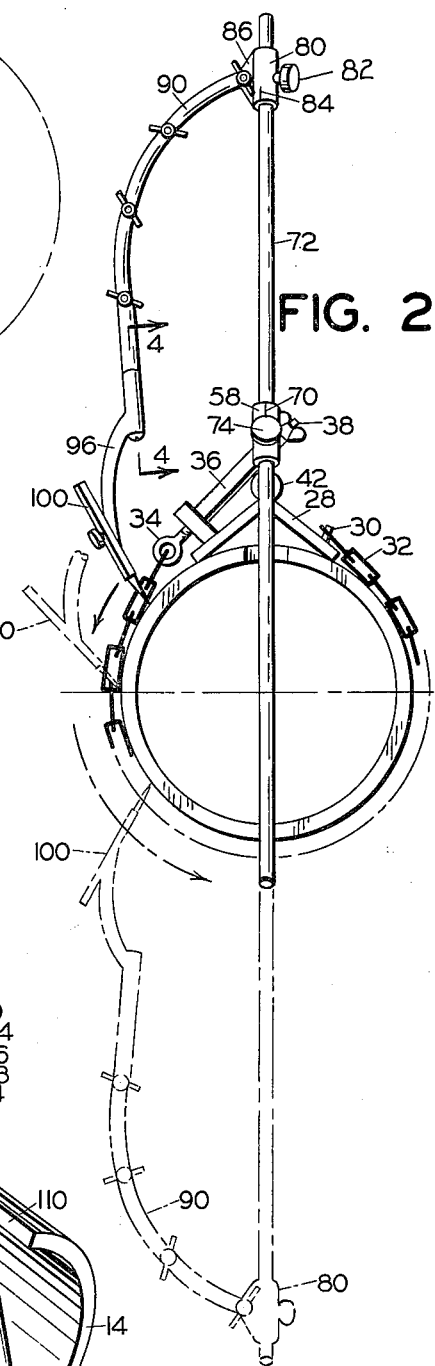
FIGURE 2 is a front elevational view of the tool taken on the line 2—2 of FIGURE 1.
Figure 1:
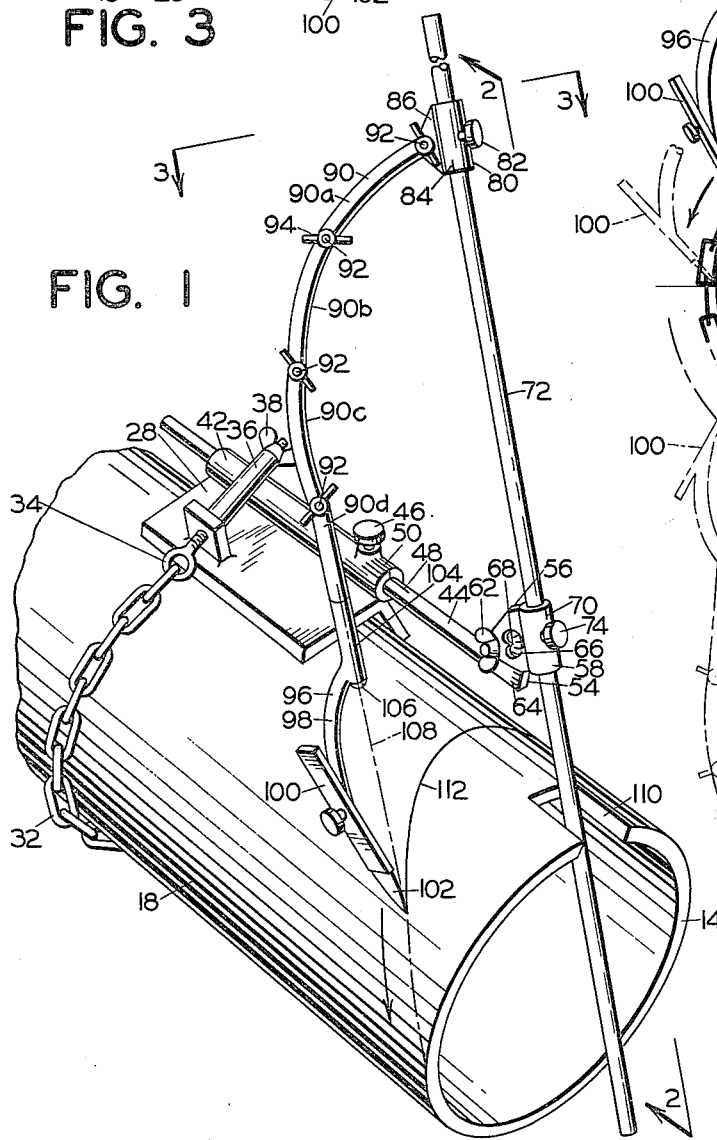
FIGURE 1 is a perspective view of the present pipe joint marking tool and showing it mounted on a pipe in position for marking.

FIGURES 1, 2 and 3 illustrate the present tool as applied to a pipe and arranged to mark a saddle cut in the end of a pipe for joining with a main pipe other than at a right angle but centered with the main pipe. Such would, for example, comprise marking the end of the pipes 14 or 18 for joining with pipe 10 in FIGURE 9.

The tool comprises a mounting base 28 adapted to be seated on a curved surface of a pipe. This base is V-shaped and in use is seated on the pipe in inverted relation. Integrated with the base 28 on the upper surface thereof is an anchor pin 30, FIGURE 2, adapted releasably to receive an end link of an attaching chain 32. The other end of chain 32 is secured to an eye bolt 34 projecting freely through a bracket 36 secured to the upper surface of base 28 on the opposite side from the anchor pin 30. The threaded projecting end of the eye bolt 34 is engageable by a wing nut 38 which upon rotation thereof in a selected direction is adapted to tighten or loosen the chain 32 around the pipe.

Thus, to clamp the base 28 securely in a set position on a pipe the chain 32 is brought around the pipe from the eye bolt and a suitable link thereof connected to the anchor pin 30. Thereupon, the wing nut 38 is rotated in a direction to draw the bolt 34 inwardly and tighten the chain around the pipe.

Integrated with the base 28 on its upper surface and in longitudinal alignment therewith is a mounting tube or socket 42 for a support bar 44. Bar 44 has slidable engagement in the tube 42 but is adapted to be secured in a set position therein by means of a set screw 46 threadedly mounted in the tube. Thus, the bar 44 is adapted for longitudinal adjustment as well as a turned adjustment, and for the purpose of locating the bar in a selected turned position it has a single graduation or reference mark 48 and the tube 42 has a plurality of graduations or reference marks 50, the marks 50 being degree designations or the like suitable for the selective turned positioning of the bar.

The forward end of bar 44 terminates in a flattened end tab portion 54 which is connected between bifurcated portions 56 of a tubular mounting bracket 58. The bracket 58 is connected to the tab 54 of the arm 44 by means of a screw 60 which projects freely through one of the bifurcated portions 56 and freely through the tab 54 but is threadedly engaged in the other bifurcated portion whereby upon threaded operation of the screw 60, as by means of an integral wing nut 62 on the free or unthreaded end, the bracket 58 may be sufficiently released from the tab 54 for free pivotal movement or it may be clamped securely thereon in any selected angle relative to the bar 44.

One side of the tab 54 has a plurality of graduations or reference marks 64 and one of the bifurcated portions 56 is provided with an opening 66 contoured to provide a pointer or reference means 68. The said marks 64 preferably comprise degree marks whereby the bracket 58 can be fixed selectively at desired angular positions relative to the bar 44. Bracket 58 has a reference mark 70 disposed centrally on its front surface at the upper end thereof, for a purpose to be described hereinafter.

Mounted in the bracket 58 is a guide bar 72. This bar is supported in front of the mounting bar 44 by means of the bracket 58 and is adapted to be fixed in a stationary position in the bracket by means of a set screw 74 threadedly mounted in the said bracket and engageable with the bar. The bar 72 is adapted to be slidably disposed in the bracket for axial adjustment upon loosening the set screw.

Slidably mounted on the guide bar 72 is a tubular mounting bracket 80 in which is threadedly engaged a set screw 82 adapted to engage the bar and anchor the bracket 80 in a stationary position when desired. Bracket 80 has a reference line 84 thereon adapted for alignment with reference line 70 in certain marking functions of the tool, as will be more apparent hereinafter.

Bracket 80 has a pair of bifurcated portions 86 between which is mounted the upper end of a marker holding arm 90. This arm is composed of four segments 90a, 90b, 90c and 90d, the uppermost segment 90a being pivotally connected between the bifurcated portions 86 and the respective segments being pivotally connected together by attaching screws 92. Screws 92 have wing nuts 94 thereon which upon tightening secure the sections 90a–90d together to form a rigid marker arm.

The lowermost segment 90d of the marker holding arm supports a marker segment 96 having a curved arm portion 98 and a holder 100 for a marking element 102 such as chalk or the like. The marker segment 96 is rotatably supported on the lower arm segment 90d and for this purpose said marker has an upper tubular portion 104, FIGURE 4, rotatably mounted on a screw 106 threadedly secured to the segment 90d. Thus, the marker has free rotation on the bottom end of the arm 90. The parts are constructed and arranged such that the tip of the marking element 102 is on a line forming a continuation of the axis of tubular support portion 104, as illustrated by the broken line 108 in FIGURE 1.

OPERATION

In illustrating the operation of the present tool it will be assumed first that a saddle cut marking is to be provided on the end of a lead-in pipe for cutting the pipe to fit into a main pipe at an angle other than a right angle and also that the pipe to receive the saddle cut is of less diameter than the main pipe. Such a set up would comprise the pipe 18 as leading into the main pipe 10 illustrated in FIGURE 9, such lead-in pipe being centered on the main pipe. Reference is first made to FIGURES 1, 2, and 3.

To accomplish such a saddle cut marking, the base 28 is secured to the pipe adjacent the end thereof by means of the chain 32. Support bar 44 is adjusted longitudinally in the mounting tube 42 to position the guide bar 72 in a desired position of marking of the arm 90. Since the lead-in pipe is to join the main pipe in centered relation, the reference mark 48 on the support bar 44 is aligned with a center or base graduation 50. In this alignment the guide bar is positioned such that it is on a line which intersects the axis of the pipe. The angle at which pipe 18 is to be joined with the main pipe 10 is of course predetermined and such angular disposition is set on the tool by inclining the mounting bracket 58 relative to the support bar 44 at the said preselected angular disposition. This is accomplished by loosening wing nut 62 and placing pointer 68 on the proper graduation mark 64 and then retightening the set screw.

Before mounting guide bar 72 in its mounting bracket 58 it is necessary that the pipe 18 be slotted at 110 at its upper end in order that the lower end of the guide bar may project therethrough. In the set up for marking thus far described, support bar 44 is securely anchored in the mounting tube 42 by means of the set screw 46 and the guide bar 72 is securely anchored in the mounting bracket 58 by means of the set screw 74, the said guide bar 72 being positioned in the bracket 58 such that the greater length thereof projects above the bracket.

Marker holding arm 90 is slidably moved down over the top of the guide bar 72, the set screw 82 being released to permit such sliding movement as well as rotatable movement, of the arm on the bar 72. The outward spacing of the marker tip from the guide bar 72 is set a selected distance from the center of said bar, such distance comprising the outside radius of the pipe to which the pipe 18 is to be joined. For example, if the pipe 18 is to be joined to a twelve inch diameter pipe the distance of set between the marker tip and the center of the bar 72 will comprise the outside radius of such twelve inch pipe, namely a six inch setting plus the wall thickness of the pipe. The setting is accomplished by releasing one or more of the wing nuts 94 and then tightening them after the setting has been made.

Thereupon, a line 112 is scribed on the upper half of the pipe by holding the marking tip in engagement with the pipe while rotating the arm 90 from one side to the other, the arm 90 sliding up and down on the bar 72 in this scribing step. It is important that the contour of the arm 90 be such that the marker engage at least the top half of the pipe, and such is accomplished by arranging the arm segments in such a bowed configuration to achieve such marking.

For example, on a large pipe the arm 90 can be contoured to an extreme outwardly bowed position. This contouring of course is accomplished prior to or at the time of selectively spacing the marker tip from the bar 72 to correspond to the outside radius of the pipe to which the present pipe is to be joined.

After the pipe has been marked on its upper half the arm 90 is moved off the top end of the guide bar 72 and the latter is then moved downwardly by first releasing set screw 74 and then after said bar has been adjusted retightening the set screw. The arm 90 is then mounted on the bottom end of the bar 72 in inverted relation and the bottom half of the pipe scribed. Such second marking position of the arm 90 is illustrated in dotted lines in FIGURE 2.

If the pipe 18 is to join the main pipe at right angles, the bar 72 will be positioned at a 90 degree angle with relation to support bar 44. In this case it will not be necessary to slot the end edge of the pipe since the guide bar 72 can be adjusted relative to the base to a position beyond the end edge of the pipe.

FIGURES 5 and 6 illustrate the position of the marking tool when making a saddle cut mark 112a on the end of a pipe to be joined with a main pipe in off-center and angular relation. Such pipe juncture is illustrated in FIGURES 10 and 11 wherein a pipe 24 joins a main pipe 22 in the direction described. The base 28 is similarly secured to the pipe which is to be marked and the slot 110 is similarly cut in the end edge of the pipe. The only difference comprises a rotated setting of the support arm 44 by loosening the set screw 46 and rotating the bar 44 relative to the tube 42 to the degree of offset at which the pipe being marked is to be joined with the other pipe. Upon such setting the bar, the marking is made in all respects similar to that described in connection with FIGURES 1–3.

The present tool is also useful in marking saddle openings 20, FIGURE 9, to receive saddle cut ends of pipes to be joined therewith. Such openings 20 are formed by mounting the base 28 on the pipe as hereinbefore described. The bar 72 is secured in its mounting bracket 58 with the bar disposed upwardly such that its lower end is above the top surface of the pipe and centered with the opening to be made. If the opening in the pipe is to receive a pipe in a right angle juncture, the bar 72 is positioned at right angles to the bar 44. This setting is accurately made through means of the graduations 64 and reference pointer 68. Thereupon, the arm 90 is manipulated to rotate the marking tip completely around the bar 72 to make the necessary mark on the pipe. If the opening is to receive a pipe at other than a right angle the bar 72 is merely inclined in the proper direction and at the proper degree. In the marking procedure, for making an opening in the surface of a pipe, the spaced setting of the marking tip 102 from the center of bar 72 will comprise the outside radius dimension of the pipe to be set into an opening.

FIGURES 7 and 8 illustrate the use of the present tool in marking pipes for miter joints. The base 28 is first secured to the pipe 10 in the usual manner. The arm 44 is securely locked in the tube 42 with the reference mark 48 aligned with the center graduation 50 and the bar 72 is secured in a fixed position in its bracket 58, the bar 72 being mounted in the bracket 58 such that the lower end thereof is above the top surface of the pipe. The arm mounting bracket 80 is brought down into rest position against the bracket 58 and such arm supporting bracket is secured in this lowered position by securing set screw 82. Importantly, the mounting bracket 80 is secured to the bar in a position such that the reference line 84 and the bracket 80 and the reference line 70 on the bracket 58 are aligned. These reference lines are selectively located on the respective brackets such that when they are in alignment the marker holding arm 90 extends laterally outwardly at a right angle to the support bar 44 and of course at right angles to the pipe axis. All the wing nuts 94 are loosened to allow free pivotal movement of the arm segments with relation to one another.

By moving the marker around the pipe, a straight miter guide line 114 will be made. With reference to FIGURE 8, the bowed construction of the marker 96 and the multiple segment construction of arm 90 permits the marking tip to reach all points of the pipe in making the miter mark.

The angle of the miter mark is determined by the angular setting of the guide bar 72 with relation to support bar 44, and for this purpose the graduation marks 64 are again used in association with pointer 68.

The present invention is useful in marking saddle cuts in the ends of pipe as well as for marking the saddle openings to receive pipe ends. The angle desired for the pipe juncture is preset through the medium of graduation marks 64 and pointer 68 and any off-center juncture is accomplished by a suitable setting of reference line 48 with graduations 50. The present device is also utilized for marking miter cuts.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A pipe joint marking tool comprising a base, means on said base for releasably attaching the base to the outer surface of a pipe, a support bar projecting longitudinally from said base and arranged for disposition substantially parallel to the pipe, a mounting bracket on one end of said support bar, a guide bar slidably mounted axially in said mounting bracket and supported in angular relation relative to said support bar, releasable attachment means interconnected between said mounting bracket and said guide bar for securing the latter in a selected axial position of adjustment in said mounting bracket, an arm slidably and rotatably mounted at one of its ends on said guide bar and having an outermost end portion, said arm having an outwardly bowed configuration, a marking head freely rotatably supported on the outermost end portion of said arm on an axis along the longitudinal axis of said outermost end portion, said marking head having a longitudinally bowed configuration, and marking means disposed on a line forming a continuation of the axis of rotation of the marker head on said arm whereby said end tip end will mark on a point aligned with the axis of said arm regardless of the rotated positioning of said marking head on said arm.

2. The pipe joint marking tool of claim 1 wherein said support bar has an axially rotatable adjustable connection with said base, and including graduation markings and reference means on said base and support bar for positioning said support bar at a selected rotated position relative to said base.

3. The pipe joint marking tool of claim 1 wherein said mounting bracket is pivotally connected to said support bar for varying the angular disposition of said support bar relative to said base, graduation markings and reference means on said mounting bracket and on said support bar for positioning said guide bar at a selected pivoted position relative to said support bar, said support bar having an axially rotatable adjustable connection with said base, and graduation markings and reference means on said base and support bar for positioning said support bar at a selected rotated position relative to said base.

References Cited by the Examiner

UNITED STATES PATENTS

| | | | |
|---|---|---|---|
| 1,922,409 | 8/1933 | Wyss | 33—21 X |
| 1,991,117 | 2/1935 | Porteous et al. | 33—21 |
| 2,464,901 | 3/1949 | Sturm | 33—21 |
| 2,586,824 | 2/1952 | Hunt | 33—21 |
| 2,659,972 | 11/1953 | Norris | 33—21 |
| 2,810,960 | 10/1957 | Johnson et al. | 33—18 X |
| 2,844,874 | 7/1958 | Sury | 33—21 |

OTHER REFERENCES

Publication: "American Machinist," "Pipe-Intersection Scriber," September 12, 1946, page 144.

ISAAC LISANN, *Primary Examiner.*